United States Patent [19]

Haberer

[11] Patent Number: 4,906,020
[45] Date of Patent: Mar. 6, 1990

[54] PASSIVE RESTRAINING BARRIER ARRANGEMENT FOR VEHICLES

[76] Inventor: Merle D. Haberer, 316 S. Elm #7, Aberdeen, S. Dak. 57401

[21] Appl. No.: 321,856

[22] Filed: Mar. 10, 1989

[51] Int. Cl.⁴ .......................................... B60R 21/08
[52] U.S. Cl. ..................................... 280/749; 280/753; 180/274; 180/281; 180/282
[58] Field of Search ............... 280/727, 801, 805, 806, 280/807, 808, 748, 749, 751, 753, 743; 180/268, 274, 281, 282; 297/468, 474, 475, 476, 477, 478, 479, 480, 481, 483, 484, 486, 487, 488

[56] References Cited

U.S. PATENT DOCUMENTS

| | | | |
|---|---|---|---|
| 3,583,726 | 6/1971 | Lindblad | 280/804 |
| 3,679,229 | 7/1972 | Weststrate | 280/803 |
| 3,680,883 | 8/1972 | Keppel et al. | 280/803 |
| 3,727,944 | 4/1973 | Wize | 280/803 |
| 3,770,078 | 11/1973 | Keppel et al. | 180/803 |
| 3,770,294 | 11/1973 | Hammer | 280/803 |
| 3,827,714 | 8/1974 | Lefeuvre | 280/804 |
| 3,831,974 | 8/1974 | Keppel | 280/804 |
| 3,833,239 | 9/1974 | Coenen | 280/804 |
| 3,837,422 | 9/1974 | Schlanger | 280/749 X |
| 3,840,249 | 10/1974 | Strom | 280/802 |
| 3,863,983 | 2/1975 | Wriedt | 297/469 |
| 3,881,744 | 5/1975 | Tupper | 280/751 |
| 3,889,970 | 6/1975 | Astheimer et al. | 280/749 |
| 3,899,042 | 8/1975 | Bonar | 297/487 |
| 3,909,038 | 9/1975 | McDonnell | 280/749 |
| 3,914,254 | 10/1975 | Shaw et al. | 549/39 |
| 3,929,349 | 12/1975 | Schubert | 280/751 |
| 3,968,978 | 7/1976 | Hayashi | 280/803 |
| 4,099,743 | 7/1978 | Non | 280/753 |
| 4,193,614 | 3/1980 | Felsing | 280/804 |
| 4,272,104 | 6/1981 | Cuny | 280/801 |
| 4,345,791 | 8/1982 | Bryans et al. | 297/250 |
| 4,394,035 | 7/1983 | Sato | 280/804 |
| 4,449,728 | 5/1984 | Pilatzki | 280/731 |
| 4,511,180 | 4/1985 | Klaus | 297/408 |
| 4,552,381 | 11/1985 | Schlanger | 280/752 |
| 4,569,534 | 2/1986 | Nalbandyan et al. | 280/742 |
| 4,669,751 | 6/1987 | Unger | 280/807 |

Primary Examiner—Charles A. Marmor
Assistant Examiner—Tamara L. Finlay
Attorney, Agent, or Firm—Kinney & Lange

[57] ABSTRACT

In a vehicle having a body with a floor, a ceiling, and a driver's seat: a passive barrier arrangement includes a restraining barrier having a restraining shield bounded by first, second and third restraining shield belts. The first and second restraining shield belts are fixed to the vehicle ceiling, and the third restraining shield belt is connected between the first two at the bottom of the shield. First and second elongate takeup belts are connected to the bottoms of the first two restraining shield belts. First and second takeup belt retractors are mounted to the body and the takeup belts are received by the retractors. The restraining barrier is held by breakaway fastening means in contact with the ceiling of the vehicle when in stowed position. When a crash occurs, the takeup belts are retracted into their retractors, bringing the restraining barrier to have position in front of a driver or passenger sitting on the vehicle seat(s).

25 Claims, 5 Drawing Sheets

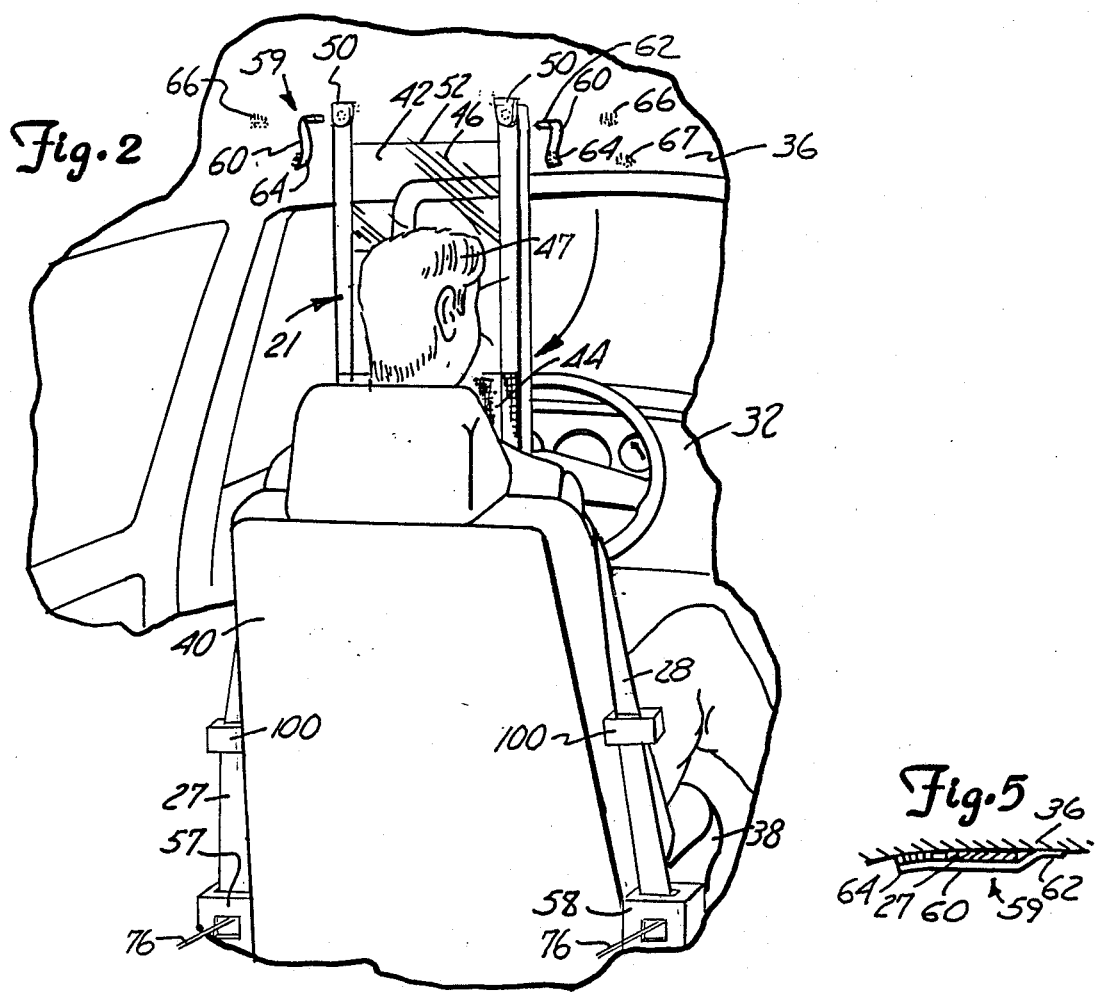
Fig. 2
Fig. 5
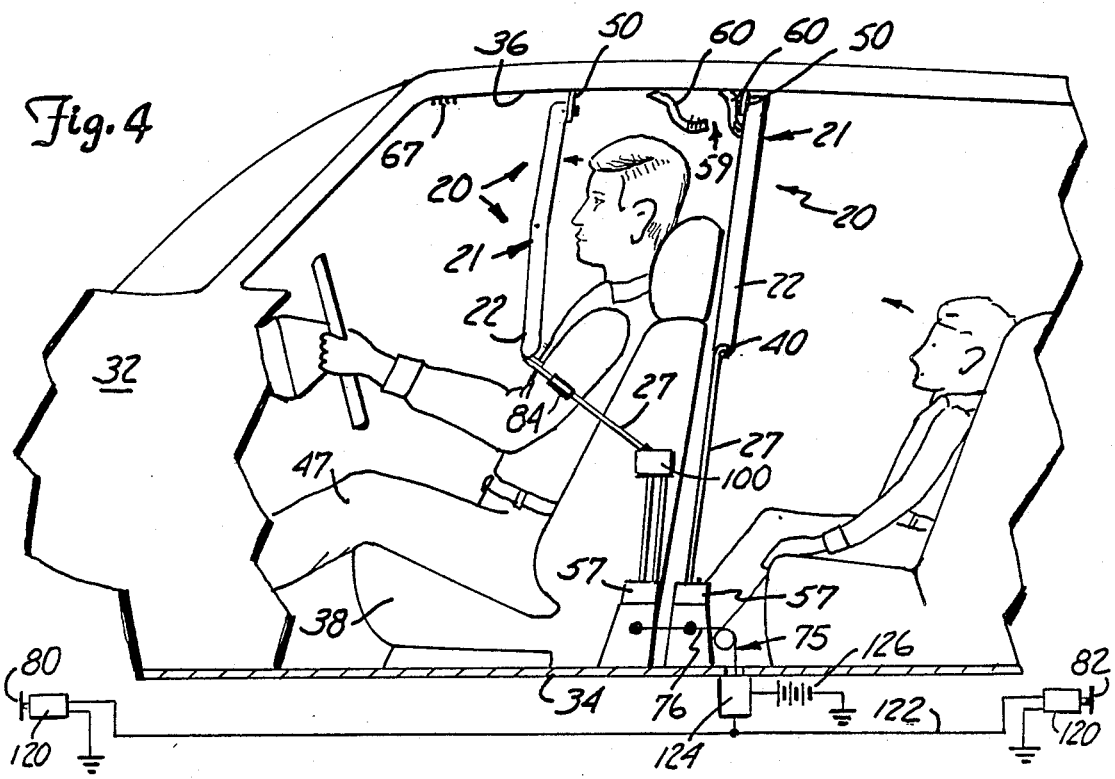
Fig. 4

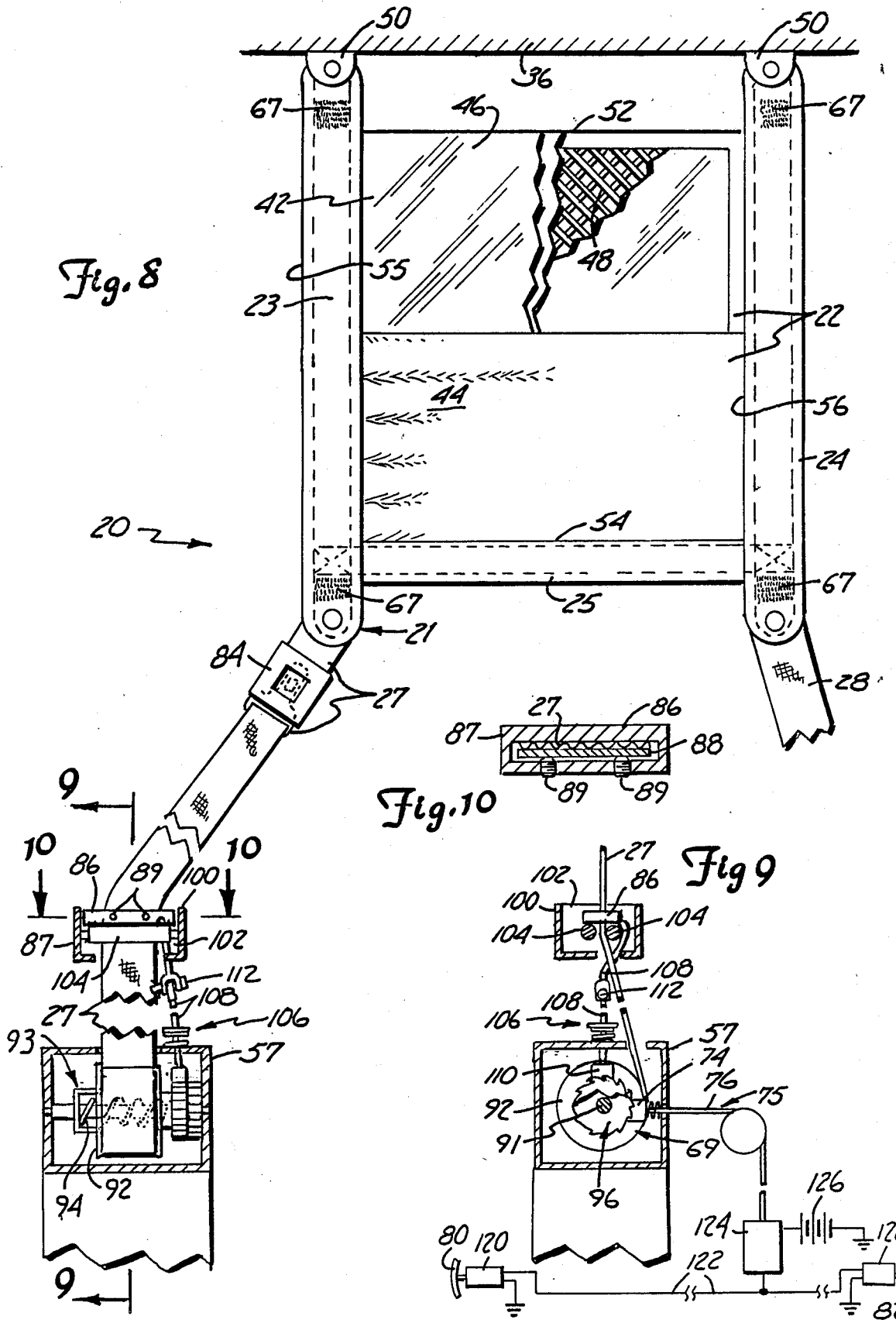

PASSIVE RESTRAINING BARRIER ARRANGEMENT FOR VEHICLES

BACKGROUND OF THE INVENTION

1. Field of the Invention

This invention has relation to a restraining shield which is nominally held in a stowed position up against the ceiling of a vehicle and is moved into a restraining position responsive to change of a vehicle condition such as attitude or momentum of predetermined magnitude.

2. Description of the Prior Art.

Lap belts and shoulder harnesses properly positioned with respect to a vehicle occupant have been demonstrated and acknowledged to be extremely important factors in reducing the amount and seriousness of injuries and in reducing fatalities in connection with motor vehicle crashes.

Because of the failure of average and careless vehicle drivers to "put on" such restraints and to insist that their passengers put on such restraints every time they enter their motor vehicles, these belts and harnesses have been largely ineffective, even though, by action of law, they must be present, and, in many jurisdictions, they must be fastened.

In an effort to achieve some measure of safety for vehicle occupants, particularly in head-on crashes, Congress has required that a passive restraining belt or an explosive device be installed in motor vehicles. The explosive device, until the present invention, was designed to be tripped or triggered by a sharp change in enertia and would substantially instantaneously fill the space between the vehicle occupant and the windshield and dash of the vehicle to absorb some of the force of the momentum of the vehicle occupant as that occupant is thrown toward the front. Such devices are commonly known as "air bags", are expensive to install, are expensive to maintain and reload after being exploded, and are susceptible to accidental discharge in less than crash situations. U.S. Pat. No. 4,449,728 to Pilatzki, granted May 22, 1984, discloses one such device.

Many attempts have been made to devise a passive restraining belt system and apparatus which will be in clearing relationship to a vehicle occupant when that occupant enters the vehicle and takes a position in the seat of the vehicle, and which will move automatically into restraining relationship with respect to that occupant before the vehicle moves forward. Such prior art devices are to some extent operative; but for one reason or another, have not become generally accepted and used.

The following U.S. patents disclose such structures: U.S. Pat. Nos. 3,583,726 to Lindblad, granted June 8, 1971; 3,679,229 to Westrate, granted July 25, 1972; 3,680,883 to Keppel et al, granted Aug, 1, 1972; 3,727,944 to Wise, granted Apr. 17, 1973; 3,770,078 to Keppel et al, granted Nov. 6, 1973; 3,770,294 to Hammer, granted on Nov. 6, 1973; 3,827,714 to Lefeuvre, granted Aug. 6, 1974; 3,831,974 to Keppel, granted Aug. 27, 1974; 3,833,239 to Conen, granted Sept. 3,1974; 3,840,249 to Strom, granted Oct. 8, 1974; 3,863,983 to Wriedt, granted Feb. 4, 1975; 3,899,042 to Bonar, granted Aug. 12, 1975; 3,914,254 to Shaw et al, granted Oct. 21, 1975; 3,968,978 to Hayashi, granted July 13, 1976; 4,193,614 to Felsing granted Mar. 18, 1980; 4,394,035 to Sato, granted July 19, 1983.

A particularly serious problem arises in the case of a vehicle crash which involves small children. In many jurisdictions, some kind of an infant seat restraining device has been mandated by law. U.S. Pat. No. 4,345,791 to Bryans et al, granted Aug. 24, 1982, discloses such a device. The effectiveness of such restraints, of course, depend on whether the adult traveling with the child has taken the time and effort to properly lock the child into the restraint; and depends on whether the child has been able to wiggle out of the restraint or partway out of the restraint before a crash occurs.

Children that are unrestrained in the back seat, for example, have been severely and even fatally injured during crashes by being catapulted up over the back of the front seat and into or through the windshield. Before the present invention, there was no device known to the applicant and those in privity with him which would position a barrier between the top of the front seat and the vehicle roof at the time of the crash to prevent a child (or even packages or other objects in the back seat) from being thrown to the front of the car.

In addition to the "air bag" restraints mentioned above, a number of other passenger restraint safety systems have been devised which are designed to be brought into position at the time of a crash. These U.S. patents include: U.S. Pat. Nos. 3,889,970 to Astheimer et al, granted June 17, 1975; 4,099,743 to Non, granted July 11, 1978; 4,511,180 to Klaus, granted Apr. 16, 1985; 4,552,381 to Schlanger, granted Nov. 12, 1985; and 4,569,534 to Nalbandyan, granted Feb. 11, 1986.

At least several patents disclose restraint systems which block the driver's view forward until the driver moves the apparatus into restraining position after being seated in the car. These U.S. patents include: U.S. Pat. Nos. 3,881,744 to Tupper, granted May 6, 1975; and 3,929,349 to Schubert, granted Dec. 30, 1975.

To bring a seat belt into position once a driver or passenger is seated, a wide variety of seat belt retractors have been created. One of these of these is disclosed in U.S. Pat. No. 4,669,751 to Unger, granted June 2, 1987.

It has been recognized in the prior art that it is highly desirable to be able to release any restraining arrangement after a crash in the event that the restrained vehicle occupant is unable to make this release. A patent concerned with this problem is U.S. Pat. No. 4,272,104 to Kuny, granted June 9, 1981.

What was needed before the present invention were passive restraining barrier arrangements which could be held in stowed position along the surface of a vehicle ceiling; which would automatically be brought into restraining positions upon the occurrence of a vehicle crash or other violent change of vehicle momentum; which could be easily tested in advance, over and over again, by any person capable of driving the vehicle; and which could be reinstalled from its restraining to its stowed position after such testing without replacement of parts and without any damage to the arrangement.

A preliminary search specific to this particular invention was not made of the records of the USPTO. The prior art listed above was from a computer search for this invention and from a collection of prior art available to applicant's attorneys because of previous work on vehicle restraining systems relating to different inventive concepts.

Applicant and those in privity with him are aware of no prior art which is closer than that set out above, and are aware of no prior art which anticipates the claims herein.

SUMMARY OF THE INVENTION

In combination with a vehicle having a body with a ceiling including a rigid portion and with a floor, the passive restraining barrier arrangement of the present invention includes a restraining barrier having a first upper end portion and a second lower end portion. The barrier is fixedly anchored to a rigid portion of the ceiling to lie transversely of the longitudinal axis of the vehicle as it moves in a forward direction. First and second elongate takeup belts are each connected at their first ends to a separate outside corner of the second lower end portion of the restraining barrier. First and second takeup belt retractors are mounted to structural portions of the vehicle body in positions spaced from each other. Second end portions of each of the takeup belts are received by one of the takeup belt retractors. Each takeup belt is movable between a stowed position with a substantial portion of its length outside of its retractor and a restraining position with a substantial portion of its length inside of its retractor.

Releasable breakaway fastening means is at least partially affixed with respect to the vehicle ceiling and at least partially affixed to the restraining barrier and is positioned to nominally hold the restraining barrier in a stowed position adjacent the vehicle ceiling, while holding portion of the takeup belts in a stowed, substantially upright position so that each takeup belt portion extends upwardly from its retractor to the ceiling.

The retractors are provided with powered drive means for moving the takeup belts from their stowed positions to their restraining positions. Enabling means are provided for enabling the drive means to move the takeup belts from their stowed positions to their restraining positions responsive to a change of a vehicle condition such as momentum or attitude of predetermined magnitude.

The configuration of the restraining barrier is such that when the retractor drive means moves the takeup belts from their stowed positions to their restraining positions, the restraining barrier will extend downwardly from where it is fixedly anchored to the ceiling to position where it will restrain humans or objects situated between it and a rear portion of the vehicle.

BRIEF DESCRIPTION OF THE DRAWINGS

FIG. 2 is a view similar to that of FIG. 1 but disolosing part of the apparatus of that form of the invention in a restraining position;

FIG. 4 is a view similar to that of FIG. 3 but disclosing both of those forms of the apparatus in restraining positions;

FIG. 5 is an enlarged detail sectional view taken on the line 5—5 in FIG. 1;

FIG. 8 is an enlarged fragmentary plan view of a restraining barrier, and other elements of the first form of the invention in restraining position as seen from the right side in FIG. 4 with parts in section and parts broken away;

FIG. 9 is a vertical sectional view taken on line 9—9 in FIG. 8;

FIG. 10 is an enlarged horizontal sectional view of a takeup belt and a takeup belt stopper taken on line 10—10 in FIG. 8.

DETAILED DESCRIPTION OF THE PREFERRED EMBODIMENTS

Figure 1:
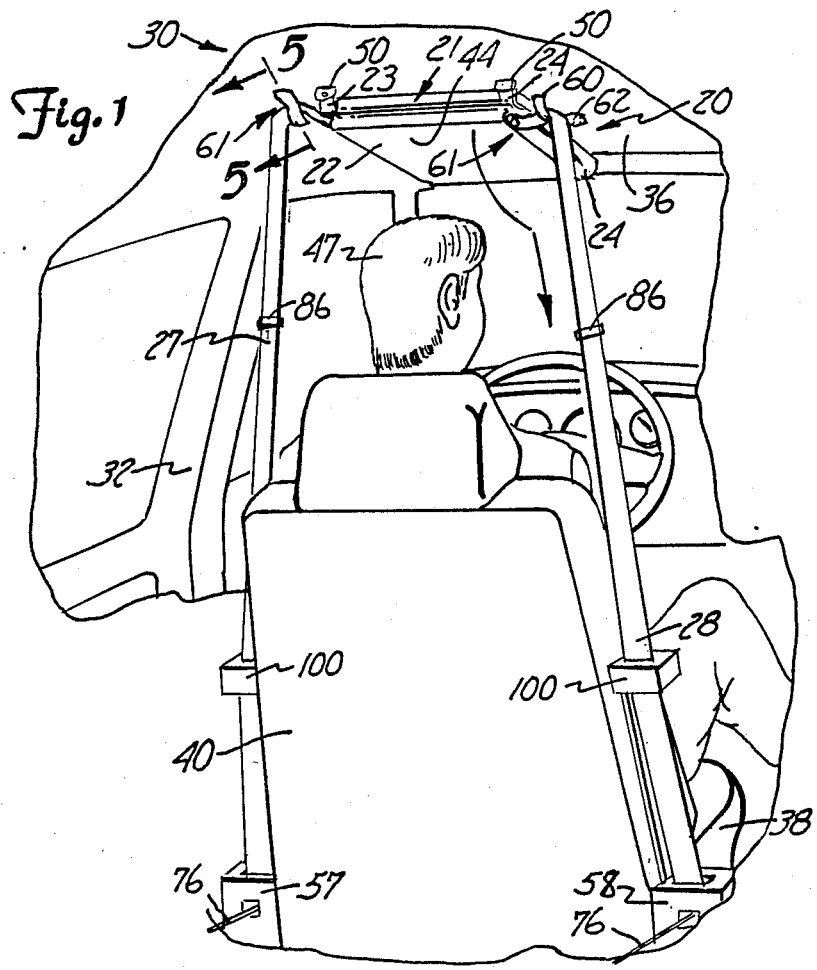
FIG. 1 is a fragmentary perspective view of the left front portion of a motor vehicle body interior disclosing a vehicle driver and part of the apparatus of a first form of the invention in a stowed position.

Referring initially to FIGS. 1 through 5, in a first form of the invention, a restraining barrier arrangement 20 includes a restraining barrier 21 having a restraining shield 22, first, second and third restraining shield belts 23, 24 and 25, respectively, each attached to one of three sides of the restraining shield, and first and second takeup belts 27 and 28 each effectively attached to two of the restraining shield belts.

The restraining barrier arrangement 20 of the present invention will be useful in a motor vehicle 30 having a body 32 including a floor 34 and a ceiling 36. A vehicle seat 38 is mounted to the floor and has an upright seat back 40.

The restraining shield 22 will preferably have an upper sight panel 42 and a lower body restraining panel 44.

The sight panel 42 can be made of a transparent film 46 of a suitable material such as polyethylene, which, in the process of absorbing the energy of motion of a passenger or driver, will yield to accommodate the features of the face such as nose and chin before rupturing. Alternatively, panel 42 could consist of other see-through materials such as an air pervious web 48 of stretchable plastic which, preferably, can yield slightly while in the process of absorbing the energy of motion of the vehicle occupant. See insert in right side of panel 22 in FIG. 8.

The lower body restraining panel 44 of the restraining shield 22 can be padded, and can be flexible or rigid as desired to accomplish an appropriate energy absorption function of the upper body of a driver or passenger.

Figure 3:
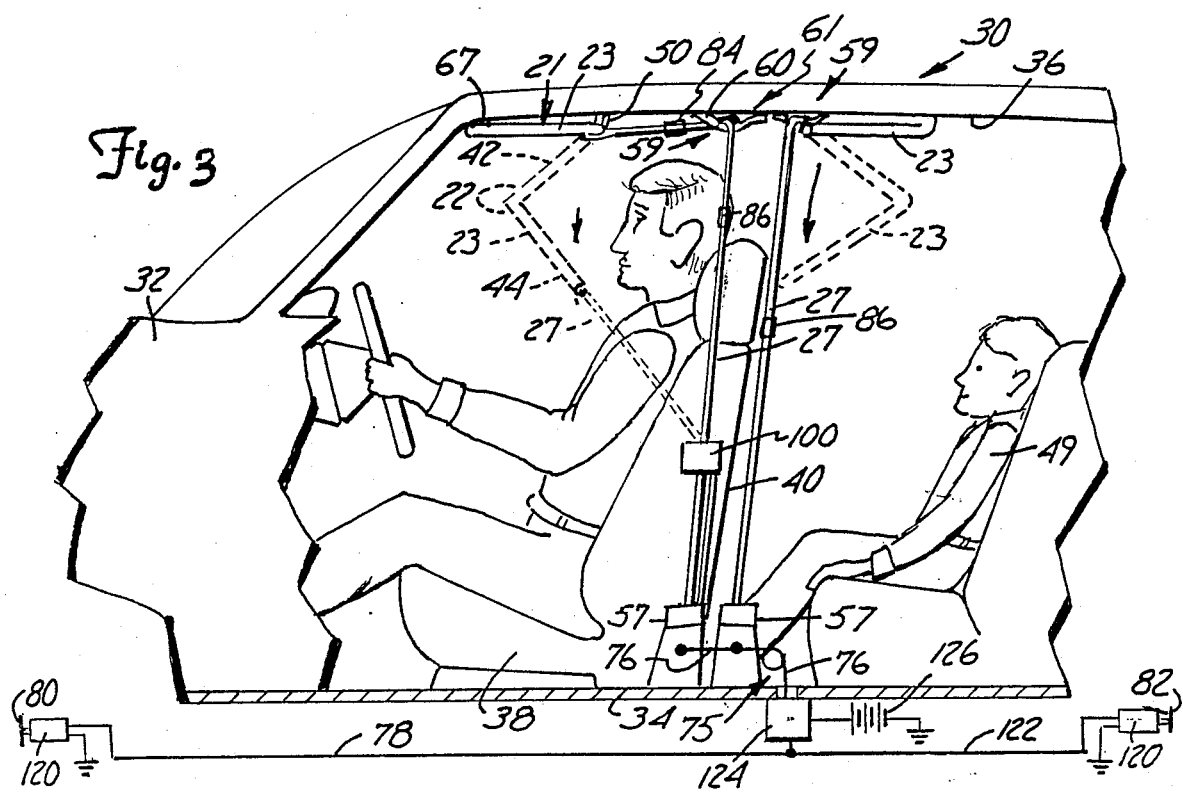
FIG. 3 is a fragmentary side elevational view of the vehicle body of FIGS. and 2 with the side of the vehicle broken away to disclose the driver and a passenger and to disclose first and second forms of the apparatus in stowed positions.

A first form of the invention is shown in FIGS. 1 and 2 and is shown in connection with a vehicle driver 47 sitting in a front vehicle seat 38 in FIGS. 3 and 4.

A second form of the invention is also shown in FIGS. 3 and 4 and is operative to prevent a juvenile passenger 49 from being catapulted over the top of the upright seat back 40 of seat 38 and thrown into the windshield in the event of a car crash.

Figure 6:
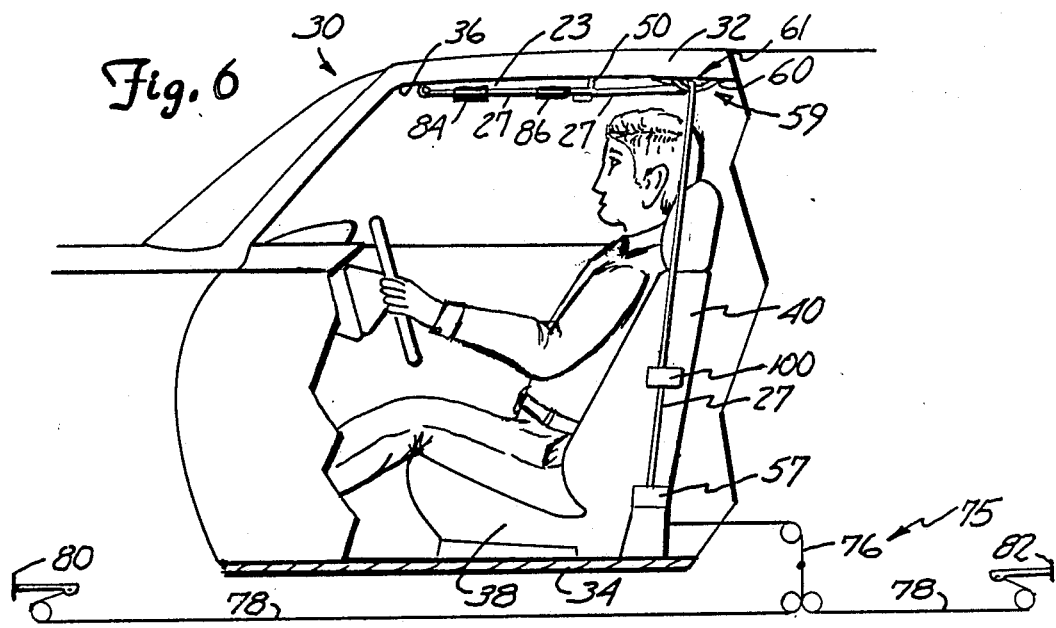
FIG. 6 is a fragmentary side elevational view of a motor vehicle body and driver similar to that shown in FIGS. 1 through 4 and disclosing part of the apparatus of a third form of the invention in a stowed position.
Figure 7:
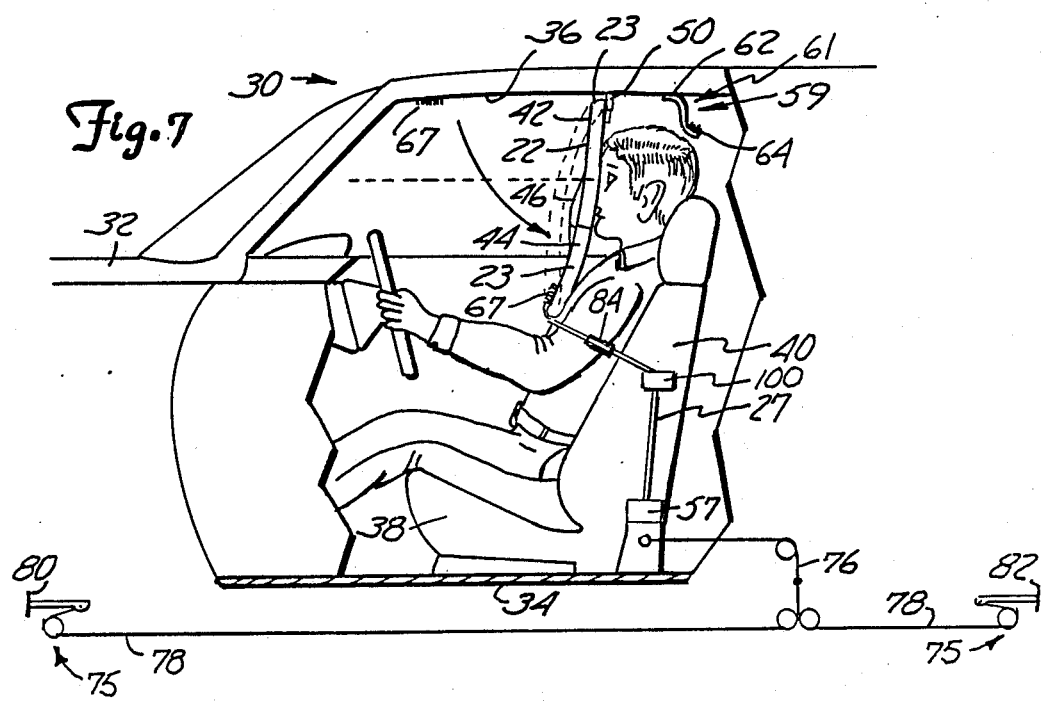
FIG. 7 is a view similar to that of FIG. 6, but disclosing apparatus of the third form of the invention in a restraining position.

A third form of the invention is shown in FIGS. 6 and 7.

Referring now to all figures, in all forms of the invention shown, a first upper end of the first restraining shield belt 23 and a first upper end of the second restraining shield belt 24 are fixedly attached to the ceiling 36 through the instrumentality of anchoring ears 50,50 extending integrally downwardly from rigid portions of the ceiling 36.

The restraining shield 22 is partially defined by a top edge portion 52, a bottom edge portion 54, a first side edge portion 55 and a second side edge portion 56. The first restraining shield belt 23 is attached to the entire length of the first side edge portion 55, the second restraining shield belt 24 is attached to the entire length of the second side edge portion 56, and the third restraining shield belt 25 is attached along the entire bottom edge portion 54 of the restraining shield 22. This attachment can be by sewing, riveting, heat sealing, or any other means of attachment suitable for the materials involved. The restraining shield 22, or at least the lower body restraining panel 44 of that shield, could be made of the same material as the first, second and/or third restraining shield belts, 23, 24 and/or 25, in which case, the attachment of those belts to that shield could be an integral attachment.

Lower end portions of the first and second restraining shield belts 23 and 24 are integrally attached to outer ends of the third restraining shield belt 25. A first upper end of first takeup belt 27 is effectively attached to a second lower end of the first restraining shield belt 23; and a first upper end of second takeup belt 28 is effectively attached to a second lower end of the second restraining shield belt 24.

As to each of the three forms of the invention, first and second spaced-apart, spring loaded, lockable, takeup belt retractors 57 and 58, respectively, are each mounted to structural portions of the vehicle body 32 on opposite sides of a vehicle seat or seats 38 to be in general vertical alignment with the upright vehicle seat back 40.

The first takeup belt 27 has a second end portion received by the takeup belt retractor 57; and second takeup belt 28 has a second end portion received by second takeup belt retractor 58. Each retractor includes a fixed axle 91, a takeup belt reel or spool 92 rotatably mounted on the axle 91, a drive spring 94 fastened between the axle and the takeup reel, and a ratchet wheel 96 concentric with and integral with the takeup reel 92. The ratchet wheel has two adjacent sets of ratchet teeth, one able to prevent rotation in a first direction and one able to prevent rotation in a second, opposite direction. See FIG. 9.

Each takeup belt is movable between a stowed position with a substantial portion of its length outside of its retractor and a restraining position with a substantial portion of its length inside of its retractor. The stowed position of these takeup belts is seen in FIGS. 1, 3 and 6, while the restraining position is seen in FIGS. 2, 4, 7 and 8.

In all forms of the invention as shown herein, the retractors 57 and 58 of each restraining barrier arrangement 20 are mounted on opposite sides of the front seat or seats 38 of a motor vehicle 30. When in stowed position each takeup belt extends upwardly adjacent the front vehicle seat back 40 to a position on the vehicle ceiling 36 generally above the seat back, and the restraining barrier 21 is mounted in an easily releasable breakaway fashion to the vehicle ceiling.

The various elements of the restraining barrier are held in the stowed position through the instrumentality of releasable, breakaway fastening means 59. Each of the takeup belts 27 and 28 are maintained in a relatively taut stowed condition extending up in a straight line from its retractor, along the sides of a vehicle seat back 40 to position adjacent the ceiling above the seat back through the instrumentality of first releasable, breakaway fastening means 61 including stowage positioning straps 60,60 fixedly attached as at 62,62 to the ceiling 36. A second outer end 64 of each strap 60 is provided with one component of a hook and loop fastener, and ceiling 36 is provided with the other components 66 of such fasteners. Then, with the takeup straps in their stowed position with respect to the retractors 57 and 58, upper portions of the takeup belts are encompassed by the straps 60, and the components of the hook and loop fasteners on the outer end 64 of the straps 60 and on the ceiling 36 are brought together to fix upper end portions of the takeup belts 27 and 28 in stowed position as seen in FIGS. 1, 3 and 6.

As seen in FIGS. 1, 2, 3 and 4, in the first form of the invention, because of the limited ceiling space between the anchoring ears 50,50 and the edge of the ceiling adjacent to the windshield, it is necessary to double at least some of the restraining shield 22 back on itself. Second releasable, breakaway fastening means 67 in the form of appropriate components of hook and loop fasteners are provided in the ceiling 36 and at various points on the restraining shield 22 and/or the first and second restraining shield belts 23 and 24, so that the entire restraining barrier 21 including the restraining shield, restraining shield belts, as well as the upper portions of the takeup belts are held flat up against the ceiling in a fully stowed position.

In the third form of the invention as seen in FIGS. 6 and 7, there is sufficient space between the anchoring ears 50,50 and the edge of the ceiling adjacent the windshield, so that the entire restraining shield 22 can be held flat in a single plane against the ceiling 36 of the vehicle body. In this form of the invention, when in the stowed position, the first ends of the takeup belts 27 and 28 can extend clear out to position adjacent the windshield where they are connected to the "lower ends" of the first and second restraining shield belts 23 and 24, respectively.

In this third form of the invention, there will be no folding and unfolding of the restraining shield 22, the shield pivoting down as a unit around its points of attachment to the anchoring ears 50,50.

It is contemplated that, in most forms of the invention, the shield 22 and the restraining shield belts can be of flexible material; but there will be situations, as in carrying only luggage on the passenger seat or in the rear, where these elements would preferably be rigid.

In the second form of the invention and where luggage is to be stored in the rear of the vehicle and needs to be restrained in case of a crash, the use of an air pervious web 48 as part or all of the restraining shield may be advisable. See FIG. 8.

In any form of the invention, the takeup belt retractors 57 and 58 can be of any usual or preferred construction. Those shown in FIGS. 8 and 9 are of a spring loaded type. As the takeup belts are "cocked" by being moved from their restraining position to their stowed position, a retractor drive spring 94 in each retractor serves as part of an energizing means 93 to store up energy so that the takeup belts can later be moved rapidly from their stowed positions to their restraining positions at the time of a crash or the like. As each takeup belt moves toward its stowed position, ratchet wheel 96 rotates with retractor reel or spool 92. A holding pawl 74 is biased lightly into contact with one set of teeth of the ratchet wheel 96 as the takeup belt is being moved into the stowed position. The ratchet wheel 96 and pawl 74 serve as a disabling means or blocking means 69 to inhibit the release of the energy being charged into the retractor drive spring 94.

With the takeup belts 27 and 28 safely held in the stowed position in the retractors 57 and 58, upper portions of each will be fastened, one at a time, against the ceiling 36 in position generally above the seat back 40 by being encompassed by stowage positioning straps 60, the first component the hook and loop fastener on the second end 64 of the stowage strap 60 will be pushed against the second component 66 on ceiling 36, thus securing the takeup belts in position as seen in FIGS. 1, 3 and 6. Second releasable, breakaway fastening means indicated variously at 67 consists of hook and loop fasteners having first components attached to the ceiling 36 and second components attached to aligned, matching locations on the various elements of the retraining shield 22 and/or restraining shield belts 23 and 24 so that each restraining shield can be fixedly positioned in stowage position flat up against the ceiling 36 as seen in FIGS. 1, 3 and 6.

Each restraining barrier arrangement 20 is at that point in properly stowed position so that it can operate appropriately whenever needed.

The first and second releasable, breakaway fastening means, 61 and 67, have been shown and described herein as being made up of hook and loop fasteners such as those sold under the trademark VELCRO; but, for example, old-fashioned snaps of the kind where first components are sewed into a first side of a part of a garment and the second components are sewed into matching positions on a second side will serve as well. It is a feature of the invention that the first fastening means 61 can break away releasing the takeup belts from the ceiling before the second fastening means 67 breaks away. This better allows the restraining shield and restraining shield belts to move more easily into proper restraining position. To a certain extent, this is inherent in the design of the invention and in the nature and direction of the forces exerted against the fastening means. However, this action can be insured, and reinforced, by providing that the second fastening means requires that more force be applied before it breaks away from the ceiling 36. This can be done, for example, by providing larger areas of hook and loop interaction to the second fastening means 67 and smaller areas of interaction to the first fastening means 61.

Action of the restraining barrier arrangement 20 to move to a restraining position can be instituted responsive to a change of vehicle condition of a predetermined magnitude; for example, a change in momentum or a change in the attitude of the vehicle.

A change in momentum of significant magnitude can be caused by a car crash, a violent spin-out on a slippery roadway or the like.

A change in vehicle attitude of significant magnitude away from a horizontal position with all wheels on the roadbed can occur well before a change of momentum of significant magnitude. For example, a driver dozing off and running off of a highway along side a ditch can cause a vehicle to tip to the right violently with very little change of momentum. Also, an all-terrain vehicle with an enclosed cab can approach and exceed its forward, backward or sideways tipping point when travelling even very slowly over rough terrain with very little momentum.

Regardless of the triggering mechanism, this action can be instituted by releasing stored energy to reel in the takeup belts. There are a number of ways of generating operation of such an energy release means. These can include the use of a conventional inertia-operated mechanism such as is presently used extensively on ordinary seatbelt and chestbelt retractors; the use of pressure developed in the brake lines when the driver jams on the brakes to try to avoid collision; the positioning of mechanical devices in contact with the front and rear bumpers; or the use of electrically powered solenoids activated by electrical switches in response to changes in vehicle attitude or momentum of predetermined magnitudes.

FIGS. 3 and 4 schematically illustrate use of electrical means to initiate movement of the restraining barrier from its stowed position to its restraining position. The shock on a front bumper 80 or a rear bumper 82 is used to trigger the energy release means 75 of each retractor by using an energy release cable 76 to withdraw withholding pawl 74 from its ratchet wheel 96. As seen in these figures, the energy release means 75 is shown to include bumper activated microswitches 120, one in operative contact with each of the bumpers 80 and 82; and an electrical line 122 which is connected to a "pull-only" solenoid 124. Cable 76 is pulled by the solenoid 124 when the solenoid is actuated. Each of the microswitches 120 is grounded. The solenoid is connected to a battery 126 which is also grounded so that the closing of either microswitch causes the solenoid to be activated to pull in on the energy release cable 76 to withdraw withholding pole 74. The battery 126, shown schematically in FIGS. 3 and 4, can either be the regular vehicle battery or can be a special battery furnishing power to the energy release means circuits only.

As shown schematically in FIGS. 6 and 7, the shock on front bumper 80 or rear bumper 82 is used to trigger an energy release means 75 at each retractor by using energy release cable 76 to withdraw each holding pawl 74 from its ratchet wheel 96.

For smoothest operation, it is desirable that every one of the holding pawls 74 be withdrawn at the same time so that the first and second takeup belts of each restraining barrier 21 combine to move that barrier into position more or less evenly.

The energy release means 75 is here shown to include a bumper actuated cable 78 attached to both or all of the energy release cables 76 in the vehicle and extending to a mechanical linkage on each of the front and rear bumpers 80 and 82, respectively. The mechanical details of such a cable operated device are set out in prior art U.S. Pat. No. 4,569,534.

Figure 11:
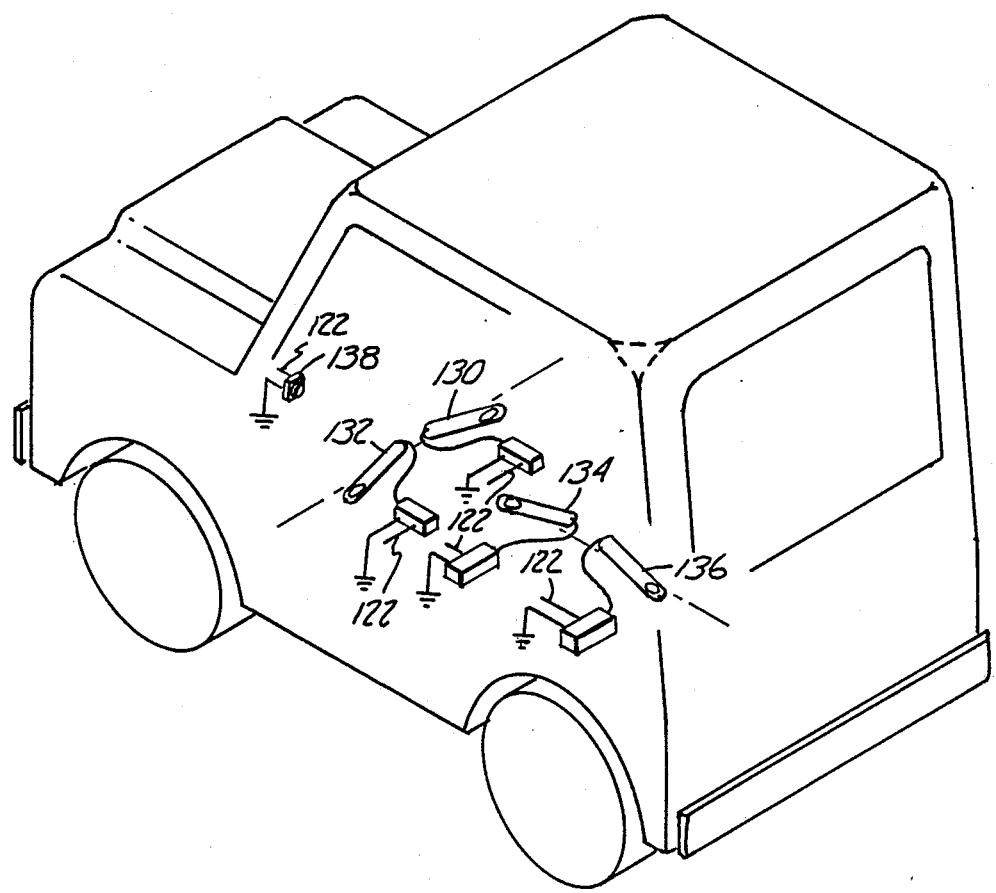
FIG. 11 is a schematic representation in perspective of the positioning of electrical momentum change sensors and attitude change sensors forming a part of an energy release means of the passive restraining barrier arrangement of the invention.

As shown schematically in FIG. 11, an elongate mercury switch 130 is fixedly mounted to a motor vehicle 30 on a longitudinal axis transverse to the longitudinal axis of the vehicle and is for the purpose of activating the energy release means 75 should the vehicle change attitude by tipping more than a predetermined magnitude to the left; an elongate mercury switch 132 is also mounted on an axis transverse to the longitudinal axis of the vehicle and is for the purpose of activating the energy release means upon a tipping to the right of more than a predetermined magnitude; an elongate mercury switch 134 is mounted permanently to the vehicle to have its axis parallel with the longitudinal axis of the vehicle to signal a change of attitude of the vehicle beyond a predetermined magnitude in the "uphill" direction, while a similar mercury switch 136 is similarly mounted but to signal a change in attitude of more than a predetermined magnitude in a "downhill" direction.

The bumper actuated microswitches 120 are also shown in FIG. 11, and the electrical line 122 extends from each of the four mercury switches and each of the bumper-actuated microswitches to one or more of the "pull only" solenoids 124. Upon change of momentum and/or attitude beyond a predetermined magnitude, one or more of these microswitches or mercury switches will close to activate the energy release means 75.

In the form of the invention as shown, the disabling means or blocking means 69 and the energy release means 75 form an enabling means capable of causing energy to be coupled to the retractors to move the takeup belts from stowed positions to restraining positions. In other forms coming within the spirit of this invention and the scope of the claims which follow, the enabling means could include electric motors, magnetic means or even explosive charges, any of which can be operative to cause the takeup belts to move from stowed positions to restraining positions upon change of vehicle momentum of predetermined magnitude.

To precisely position the restraining barriers 21 of each form of the invention, the precise length of each takeup belt 27 and 28 which is retracted within the retractors 57 and 58, respectively, is positively controlled. This is done so that the restraining shields 22 will end up at optimum positions in front of the vehicle occupants and will not be rapidly jerked down into contact with the occupants to disturb, strike, frighten or injure the occupants when the shields come into position or, in the case of the driver, to prevent his concentration on operation of the vehicle during the emergency.

This positive and precise control of the positioning of each restraining shield 22 in its restraining position is accomplished using takeup belt stoppers 86, one on each takeup belt. As seen in FIG. 10, each stopper 86 includes a body 87 with a takeup belt encompassing slot extending through it, a belt clamping plate 88 situated in the slot, and a pair of set screws 89,89. These set screws are accessible from outside the body 87 and are in position to press the clamping plate 88 against one of the takeup belts 27 or 28 after that belt has been inserted through the body slot between the clamping plate 88 and the stopper body 87.

In order to obtain the optimum angle of the takeup belts 27 and 28 when in restraining position, takeup belt guides 100 are situated in substantially vertical alignment above each of the retractors 57 and 58 in the first and third forms of the invention. As shown, these guides can be mounted in any usual or preferred manner on the sides of the upright vehicle seat backs 40, or can otherwise be mounted to solid structural portions of the vehicle body. Each guide includes a central opening 102 therethrough in which two mutually parallel guide rollers or shafts 104,104 are extended. Each takeup belt extends from its retractor and through the central opening 102 and between the guide rollers 104,104 of the guide belt 100.

In the form of the invention as shown, it is the arrival of the takeup belt stopper 86 in contact with the guide rollers 104,104 which positively controls the length of each takeup belt from the retractor to its connection with the first or second restraining shield belt 23 or 24 when in the restraining position.

A locking means 106 is provided to be responsive to the arrival of the restraining barrier 21 at the restraining position to instantly prevent the takeup belts 27 and 28 from making any movement back toward their stowed positions. As shown, this locking means includes a locking rod !08 extending through a guide hole in the upper case of each takeup belt retractor 57 and 58 and up into the central opening 102 in the takeup belt guide 100 to be in the path of the takeup belt stopper 86 as it moves into its limiting position in contact with rollers 104,104. On the bottom end of locking rod 108 is a locking pawl 110 which is nominally spring biased out of contact with ratchet wheel 96.

As the restraining barrier reaches its optimum restraining position, the takeup belt stoppers 86 associated with each retractor 57 and 58 will contact their locking rods 10 forcing the looking pawls 110 into operative contact with the teeth of the ratchet wheels 96 which face in a direction opposite the teeth contacted by the holding pawl 74. See FIG. 9. This will prevent any movement of the takeup belts away from their retractors while the restraining shield 22 is in position to absorb the energy of momentum of the occupants of the vehicle during the crash.

Other forms of locking means of any usual or preferred construction can be utilized to lock the takeup belts in their restraining positions in any of the three forms of the invention as shown or in any other forms of the invention. Similarly, in connection with the second form of the invention, for example, other forms of takeup belt stopping mechanisms can be used to precisely limit and determine the final positioning of the restraining barrier and its restraining shield.

OPERATION

Responsive to a violent change of vehicle momentum or a large change in vehicle attitude above a predetermined minimum magnitude, each energy release cable 76 will move to the right as seen in FIGS. 3 and 6, withdrawing the holding pawls 74 from contact with ratchet wheel 96 disabling the blocking means 69. Energizing means 93 including retractor drive springs 94 will then retract takeup belts 27 and 28 into their retractors, initially pulling first end portions of those belts free of the stowage straps 60,60 due to the action of the first releasable breakaway fastening means 61, and then pulling apart the various elements of the second releasable, breakaway fastening means 67. This starts movement of the restraining barriers 21 to position as seen in dotted lines in FIG. 3, for example. This action will continue breaking all of the second fastening means apart so that the restraining barrier will take the position as seen in FIGS. 2 and 4. When the takeup belt stoppers 86 come in contact with the retractor locking rods 108, the retractor locking pawls 110 will be forced into place against the ratchet wheels 96, thus positively locking the takeup belts and thus the other elements of the restraining barrier 21 against movement away from the restraining position. See FIG. 9.

In this restraining position, the restraining barrier arrangements 20 in the various forms of the invention will be in position, variously, to absorb the force of the driver's head and upper body without interfering with the action of his legs and feet on the controls of the car and without forcing his hands and arms away from the steering wheel; will be in position to absorb the energy of momentum of any front seat passenger aligned with such a restraining barrier arrangement; and will be in position to intercept and absorb the energy of momentum of rear seat passengers (large or small) or of rear compartment stowed packages as they are catapulted into a flight path between the seat back(s) 40 and the vehicle ceiling 36.

In the first form of the invention, as soon the vehicle comes to rest, if the driver is still conscious, he can easily reach a quick release mechanism 84, in the takeup belt 27. See FIGS. 4 and 8. If the driver is not conscious, or if parts of the vehicle have been deformed so as to trap him in place when the vehicle comes to a stop, others can reach in to operate the quick release mechanism 84 thus to allow the restraining shield 22 to be pushed to one side, so that the driver can remove himself or be removed from the doorway of the vehicle.

The quick release mechanism 84 can be of any usual or preferred construction. For a front seat passenger, the quick release mechanism can preferably be in the second takeup belt 28. Where the second form of the invention is installed in two-door vehicles, quick release mechanisms 84 may best be situated in both takeup belts 27 and 28. In four-door vehicles where the second form of the invention is installed, such release mechanisms 84 may not be needed.

An important feature of this passive restraining barrier arrangement is that it can be tested by anyone capable of driving a motor vehicle. In the form of the invention as shown, for example, with occupants seated in the vehicle, or without anyone in the vehicle, electrical line 122 can be grounded, either by actuating one of the electrical switches 120, 130, 132, 134 or 136 by closing a test switch 138 as seen in FIG. 11. In other forms, the bumper actuated cable 78 can be accessed at one of the bumpers 80 or 82, or anywhere else along the line, and that cable moved in direction away from its junction with the energy release cables 76. This will cause all of the restraining barrier arrangements 20 in the vehicle to move instantly from stowed position to restraining position, demonstrating conclusively the effectiveness and working operation of each arrangement.

Any person capable of driving a motor vehicle can then easily "reload" each restraining barrier arrangment.

First a locking rod coupling pin 112 will be withdrawn from the yoke and tougue coupling of each locking rod 108 allowing each locking pawl 110 to move away from its ratchet wheel 96. See FIGS. 8 and 9.

Each takeup belt 27 and 28 can then be freely unreeled from its retractor. Each quick release mechanism 84 in any takeup belt can be recoupled, and the takeup belts can be refastened in stowed position with respect to the ceiling 36 using the storage positioning straps 60,60 of the first releaseable, breakable fashioning means 61. Upper portions of these takeup belts and the various elements of each restraining shield 22 can be properly positioned and fastened back up to the ceiling in stowed position using the second releaseable, breakable fastening means 67.

As the takeup belts are reeled out of their retractors, the holding pawls 74 are operative on the ratchet wheels 96 to retain the energy stored in the retractor drive springs 94 so that when the restraining barrier arrangements are again in stowed position, the blocking means 69, including holding pawls 74 and ratchet wheels 96, are again positioned to permit the restraining barrier arrangements 20 to stay in stowed position until the next test, or until a violent change in vehicle momentum or attitude occurs as a prelude to a possible crash.

Although the present invention has been described with reference to preferred embodiments, workers skilled in the art will recognize that changes may be made in form and detail without departing from the spirit and scope of the invention.

What is claimed is:

1. The combination with a vehicle adapted to move nominally along a longitudinal vehicle axis in a forward direction, the vehicle having a body with a ceiling including a rigid portion and a floor, of a passive restraining barrier arrangement; said barrier arrangement including:
   a. a restraining barrier having a first upper end portion and a second lower end portion, the barrier being fixedly anchored to a rigid ceiling portion of the body to lie transversely to the vehicle longitudinal axis;
   b. first and second elongate takeup belts, each having a first end thereof effectively connected to a separate outside corner of the second lower end portion of the restraining barrier;
   c. first and second takeup belt retractors mounted to structural portions of the body in positions spaced from each other no less than the maximum width of the restraining barrier measured transverse to the vehicle axis, and no farther forward in the body than a position vertically below the connection of the restraining barrier to the rigid ceiling portion of the body;
   d. said takeup belts each having a second end portion received by one of said takeup belt retractors, each takeup belt being movable between a stowed position with a substantial portion of its length outside of its retractor and a restraining portion with a substantial portion of its length inside of the retractor;
   e. releasable fastening means at least partially affixed with respect to the vehicle ceiling, at least partially affixed to the restraining barrier and positioned to nominally hold the restraining barrier in a stowed position adjacent the vehicle ceiling and to hold a portion of the takeup belts in a stowed, substantially upright position, each such belt portion extending upwardly from its retractor to the ceiling;
   f. wherein said retractors are provided with powered drive means for moving said takeup belts from their stowed positions to their restraining positions;
   g. said arrangement including enabling means for enabling said drive means to move said takeup belts from their stowed positions to their restraining positions responsive to change of a vehicle condition of predetermined magnitude;
   h. wherein the configuration of the restraining barrier is such that when the retractor drive means has moved the takeup belts from their stowed positions to their restraining positions, the restraining barrier will have position extending downwardly from the point where it is fixedly anchored to the ceiling; and
   i. wherein the restraining barrier is provided with locking means responsive to the arrival of the restraining barrier at its restraining position to prevent said takeup belts from returning toward their stowed positions.

2. The combination with a vehicle having a body with a floor, a ceiling including a rigid portion, and a floor mounted, forwardly facing vehicle seat, of a passive restraining barrier arrangement; said restraining barrier arrangement including:
  a. a restraining barrier having a first upper end portion and a second lower end portion, the barrier being fixedly anchored at a first upper end thereof to a rigid ceiling portion of the body in position generally above the seat;
  b. first and second elongate takeup belts, each having a first end thereof effectively connected to a separate outside corner of the second lower end portion of the restraining barrier;
  c. first and second spaced-apart takeup belt retractors mounted to structural portions of the body adjacent opposite sides of the vehicle seat;
  d. said takeup belts each having a second end portion received by one of said takeup belt retractors, each takeup belt being movable between a stowed position with a substantial portion of its length outside of its retractor and a restraining position with a substantial portion of its length inside of its retractor;
  e. break-away fastening means at least partially affixed with respect to the vehicle ceiling, at least partially affixed to the restraining barrier and positioned to nominally hold the restraining barrier in a stowed position adjacent to the vehicle ceiling and to hold a portion of the takeup belts in substantially upright position between the retractors and the vehicle ceiling;
  f. said retractors being provided with powered drive means for moving said takeup belts from their stowed positions to their restraining positions;
  g. enabling means for enabling said drive means to move said takeup belts from their stowed positions to their restraining positions responsive to change of vehicle condition of predetermined magnitude;
  h. wherein the configuration of the restraining barrier is such that when the retractor drive means has moved the takeup belts from their stowed positions to their restraining positions, the restraining barrier will have position extending downwardly from the point where it is fixedly anchored to the ceiling; and
  i. wherein the restraining barrier arrangement is provided with locking means responsive to the arrival of the restraining barrier at its restraining position to instantly prevent said takeup belts from returning toward their stowed positions.

3. The combination of claim 2 wherein:
  j. means provided to disable the locking means after the restraining barrier has reached its restraining position responsive to action of the takeup belt retractors.

4. The combination of claim 2 wherein:
  j. limiting means is provided to precisely limit the length of the takeup belts extending above the takeup belt retractors as these belts are being retracted into their restraining positions.

5. The combination of claim 4 wherein:
  k. said limiting means includes a takeup belt stopper fixedly positioned on each takeup belt and a stop means fixedly positioned with respect to each retractor to be in the path of each belt.

6. The combination of claim 2 wherein the vehicle seat has an upstanding seat back, and:
  j. wherein the breakaway fastening means is so positioned as to hold the upright portions of the takeup belts in stowed positions along the side surfaces of the seat backs.

7. The combination of claim 6 wherein:
  k. a takeup belt guide is fixedly positioned with respect to each of the side edges of the vehicle seat back in encompassing relation to one of the takeup belts to confine that portion of the takeup belts between said guides and the takeup belt retractors to parallel, overlying relation to the seat back side edges when said takeup belts are in their restraining positions.

8. The combination of claim 2 wherein:
  j. the means for enabling the drive means includes at least one sensor which is activated by a change in vehicle momentum of at least a predetermined magnitude.

9. The combination of claim 8 wherein:
  k. the vehicle has at least one bumper; and
  l. the enabling means sensor is fixed to the vehicle body in position to sense relative movement between the bumper and the sensor.

10. The combination of claim 2 wherein:
  j. the means for enabling the drive means includes at least one sensor which is activated by a change of attitude of at least a predetermined magnitude.

11. The combination of claim 10 wherein:
  k. the enabling sensor is fixed to the vehicle body in position to be inoperative when the vehicle is supported on a horizontal surface and to become activated when the vehicle body assumes an attitude out of that horizontal configuration of at least a predetermined magnitude.

12. The combination of claim 11 wherein: l. the sensor includes a vial containing electrically conductive liquid and at least two spaced apart electrical contacts out of contact with the liquid when the body is supported on said horizontal surface.

13. The combination of claim 12 wherein:
  m. the sensor includes a mercury switch.

14. The combination with a vehicle having a body with a floor, a ceiling including a rigid portion, and a floor mounted, forwardly facing vehicle seat with an upright back, of a passive restraining barrier arrangement for humans; said restraining barrier arrangement including:
  a. a restraining barrier including:
    (1) a restraining shield having top and bottom edge portions and a pair of side edge portions, at least a portion of the shield being transparent,
    (2) first and second shield belts, each having a first upper end portion and a second lower end portion, each belt being fixedly anchored at a first upper end thereof to a rigid ceiling portion of the body to have position generally above the seat and each belt being fixedly attached to the restraining shield along the entire length of one of the pair of shield side edge portions,
    (3) a third restraining shield belt fixedly attached to the restraining shield along the entire length of the shield bottom edge portion and to the second lower end portion of each of the first and second restraining shield belts, and
    (4) first and second elongate takeup belts, each having a first end effectively connected to a second end of one of the first and second restraining shield belts;

b. first and second spaced apart takeup belt retractors mounted to structural portions of the body adjacent opposite sides of the vehicle seat;

c. said takeup belts each having a second end portion received by one of said takeup belt retractors, each takeup belt being moveable between a stowed position with a substantial portion of its length outside its retractor and a restraining position with a substantial portion of its length inside its retractor;

d. energizing means operative responsive to movement of the takeup belts from their restraining positions to their stowed positions to precharge the retractors with sufficient energy to rapidly return the restraining belts to their restraining positions;

e. blocking means operative responsive to movement of the takeup belts to their stowed positions to inhibit release of such precharged energy;

f. energy release means operative to disable said blocking means responsive to change of vehicle condition of predetermined magnitude to cause said retractors to move said takeup belts from their stowed positions to their restraining positions;

g. first breakaway fastening means at least partially affixed to the vehicle ceiling in generally vertical aligned relation with the vehicle seat back and adapted to hold a portion of each takeup belt in adjacent relation to the ceiling when said takeup belts are in their stowed positions;

h. second breakaway fastening means at least partially affixed with respect to the vehicle ceiling in forwardly spaced relation with respect to the first fastening means and operative at least upon portions of the restraining shield and the first and second restraining shield belts to hold the restraining barrier in a stowed position in close proximity to the vehicle ceiling as long as the first fastening means holds said takeup belt portions in their stowed positions in adjacent relation to the ceiling;

i. wheren the configuration of the restraining barrier is such that when the retractors have caused the takeup belts to move from their stowed to their restraining positions, the restraining shield will have a restraining position immediately in front of the head and upper body of a human seated on the vehicle seat; and j. wherein the arrangement includes locking means responsive to the arrival of the restraining shield at its restraining position to instantly prevent said takeup belts from returning toward their stowed positions.

15. The combination of claim 14 wherein:

k. the character of the first and second breakaway fastening means and the positioning of the first breakaway fastening means with respect to the takeup belts when in stowed position is such that the first breakaway fastening means will release before release of any of the second breakaway fastening means.

16. The combination of claim 14 wherein:

k. a takeup belt guide is fixedly positioned with respect to each side of the vehicle seat back in encompassing relation to one of the takeup belts to confine that portion of the takeup belts between said guides and the takeup belt retractors to parallel relation to the seat back side eges when the takeup belts are in their restraining positions.

17. The combination of claim 14 wherein:

k. means is provided to disable the locking means after the restraining barrier has been brought to its restraining position responsive to action of the takeup belt retractors.

18. The combination of claim 14 wherein:

k. limiting means is provided to precisely limit the length of the takeup belts extending above the takeup belt retractors as these belts are being retracted into their restraining positions.

19. The combination of claim 18 wherein:

l. said limiting means includes a takeup belt stopper fixedly positioned on each takeup belt and a stop means fixedly positioned with respect to each retractor to be in the path of each belt.

20. The combination with a vehicle having a body with a floor, a ceiling including a rigid portion, and a floor mounted, forwardly facing vehicle seat, of a passive restraining barrier arrangement; said restraining barrier arrangement including:

a. a restraining barrier including:
(1) a restraining shield having top and bottom edge portions and a pair of side edge portions;
(2) first and second restraining shield belts, each having a first upper end portion and a second lower end portion, each belt being fixedly anchored at a first upper end thereof to a rigid ceiling portion of the body to have position generally above the seat and each belt being fixedly attached to the restraining shield along the entire length of one of the pair of shield side edge portions, and
(3) first and second elongate takeup belts, each having a first end effectively connected to a second end of one of the first and second restraining shield belts;

b. first and second spaced-apart takeup belt retractors mounted to structural portions of the body adjacent opposite sides of the vehicle seat;

c. said takeup belts each having a second end portion received by one of said takeup belt retractors, each takeup belt being movable between a stowed position with a substantial portion of its length outside of its retractor and a restraining position with a substantial portion of its length inside of its retractor;

d. energizing means operative responsive to movement of the takeup belts from their restraining positions to their stowed positions to precharge the retractors with sufficient energy to rapidly return the restraining belts to their restraining positions;

e. blocking means operative responsive to the movement of the takeup belts to their stowed positions to inhibit release of such precharged energy;

f. energy release means operative to disable said blocking means responsive to change of vehicle condition of predetermined magnitude to cause said retractors to move said takeup belts from their stowed positions to their restraining positions;

g. first releaseable fastening means at least partially affixed to the vehicle ceiling in generally vertical aligned relation with the vehicle seat and adapted to hold the portion of each takeup belt in adjacent relation to the ceiling when said takeup belts are in their stowed positions;

h. second releaseable fastening means at least partially affixed with respect to the vehicle ceiling in forwardly spaced relation with respect to the first fastening means and operative at least upon portions of the restraining shield and restraining shield belts to hold the restraining barrier in a stowed position in close proximity to the vehicle ceiling as long as the first fastening means holds said takeup belt portions in their stowed positions in adjacent relation to the ceiling;

i. wherein the configuration of the restraining barrier is such that when the retractors have caused the takeup belts to move from their stowed to their restraining positions, the restraining shield will have a restraining position extending downwardly from the first upper ends of the restraining shield belts in direction generally toward the vehicle seat; and j. wherein the arrangement includes locking means responsive to the arrival of the restraining shield at its restraining position to instantly prevent said takeup belts from returning toward their stowed positions.

21. The combination of claim 20 wherein the vehicle seat has an upstanding seat back, and:

k. wherein said first releasable fastening means is affixed to the ceiling in generally vertically aligned relation to the vehicle seat back and is thus adapted to hold the portions of the takeup belts between the retractors and the ceiling in upright, aligned, adjacent relation to side edges of the vehicle seat back when the takeup belts are in stowed positions.

22. The combination of claim 21 wherein:

1. a takeup belt guide is fixedly positioned with respect to each of the side edges of the vehicle seat back in encompassing relation to one of the takeup belts to confine that portion of the takeup belts between said guides and the takeup belt retractors to parallel, overlying relation to the seat back side edges when the takeup belts are in their restraining positions.

23. The combination of claim 20 wherein:

k. means is provided to disable the locking means after the restraining barrier has been brought to its restraining position responsive to action of the takeup belt retractors.

24. The combination of claim 20 wherein:

k. limiting means is provided to preoisely limit the length of the takeup belts extending above the takeup belt retractors as these belts are being retracted into their restraining positions.

25. The combination of claim 24 wherein:

1. said limiting means includes a takeup belt stopper fixedly positioned on each takeup belt and a stop means fixedly positioned with respect to each retractor to be in the path of each belt.

* * * * *

UNITED STATES PATENT AND TRADEMARK OFFICE
CERTIFICATE OF CORRECTION

PATENT NO. : 4,906,020

DATED : March 6, 1990

INVENTOR(S) : Merle D. Haberer

It is certified that error appears in the above-identified patent and that said Letters Patent is hereby corrected as shown below:

Column 18, line 18, delete "preoisely" and insert --precisely--.

Signed and Sealed this

Second Day of April, 1991

Attest:

HARRY F. MANBECK, JR.

*Attesting Officer*     *Commissioner of Patents and Trademarks*